Patented Dec. 9, 1952

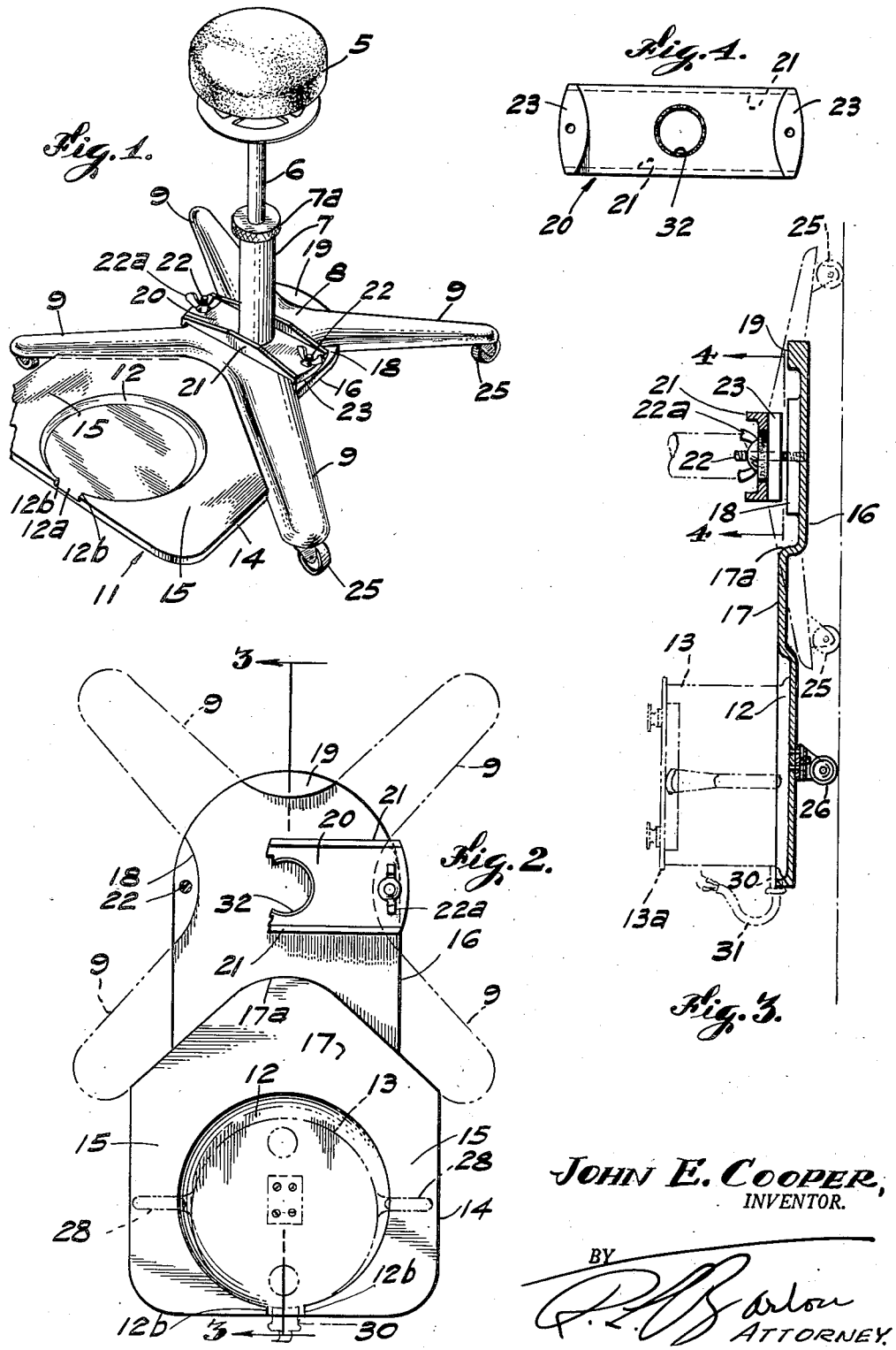

2,620,863

UNITED STATES PATENT OFFICE 2,620,863

DENTAL STOOL EXTENSION FOR FEET AND MOTOR CONTROL SUPPORT

John E. Cooper, Los Angeles, Calif.

Application July 26, 1949, Serial No. 106,768

7 Claims. (Cl. 155—188)

This invention relates to an attachment for a dentist's stool which combines a foot rest and dental motor control support.

Owing to the fact that there are too few dentists to care for the dental needs of our nation, most of our dentists are overworked and therefore usually experience irritability and fatigue by mid-afternoon. Also the overworked dentist is apt to be afflicted with fallen arches, varicose veins and other ailments resulting from being too long on his feet and from working in unhygienic postures.

Notwithstanding the fact that the most skillful dental tool work is done in a sitting position, dentists as a rule are not permitted to avail themselves of using this position, because most of their rest stools lack efficiency, one common defect being that their use does not obviate the necessity of the dentist having laboriously to drag the foot control around with his feet.

One of the objects of the present invention is to provide an attachment for a dental stool that will support the foot control of the dental motor where it is conveniently operable by the dentist while seated upon the stool and does not have to be moved over the floor by shuffling movements of the dentist's feet.

Another object is to provide, in combination with the means for supporting the dental motor control in a convenient position for foot operation, a foot rest means that will contribute to doing dental work in a relaxed position of the legs, thus materially diminishing the fatigue experienced by the busy dentist.

Another object is to provide, for overcoming the aforementioned disadvantages of present dental practice, a simple, relatively inexpensive attachment that can be easily applied, without the use of special tools, to the large number of dental stools already on the market.

In one of its broader aspects the invention includes a dental stool having a basal portion provided with a horizontally extending caster supported part provided with a seat to support a dental motor control in front of the dentist and conveniently accessible to his feet when he is seated upon the stool and also affording at all times a comfortable support for his feet.

. Other objects, advantages and features of invention will hereinafter appear.

Referring to the accompanying drawing, which illustrates a preferred embodiment of the invention, Fig. 1 is a perspective view showing the device applied to a conventional dental stool.

Fig. 2 is an enlarged plan view, the motor control and feet of the stool being operatively shown in phantom lines, a portion of the plate which secures the device to the stool being shown broken away so as to more clearly disclose underlying structure.

Fig. 3 is a longitudinal midsection on line 3—3 of Fig. 2, the position of the dental motor control and of the stool base and its standard being indicated by phantom lines.

Fig. 4 is a bottom plan view of the securing plate used to attach the device to the dental stool.

Referring in detail to the drawing, the conventional dental stool shown comprises a seat 5 having a supporting stem 6 supported for vertical adjustment within a tubular standard 7 which upstands from the center of a base 8 from which radiate four caster-carrying feet 9.

The invention includes a horizontal, basal attaching plate 11 having in its upper face a circular seat 12 to receive the foot operable control 13 of a dental motor. Said seat 12 is located in the substantially rectangular body portion 14 of said attaching plate 11, this plate having a foot rest area 15 at each side of said seat 12 and a narrowed rearward extension 16 that underlies and extends rearwardly of the aforesaid foot-carrying base 8, there being an upwardly offset portion 17 provided across the width of the plate 11 immediately behind the aforesaid circular seat 12 therein. This upwardly offset part 17 has a curved central rear shoulder 17a and has straight side portions, thus being contoured to fit in between the front sides of the front pair of stool feet 9.

The rearward extension 16 of the base plate 11 has at each side an upward projection 18 and at its rear end an upward projection 19. These three projections have convex inner side portions which fit into the concave space between the side faces of the inner portions of the outwardly extending carrying feet of the stool base 8 at the rear and right and left and cooperate with the convex rear side of the aforementioned rear shoulder 17a to form a structure which in its assembled condition fits in a snug, horizontally extending manner against all four of the inter-foot spaces of the stool base 8. All shifting movement between the attachment and the stool base is thus prevented.

The invention further comprises an elongated clamp plate 20 which rests upon the upper surface of the stool base 8, said plate 20 having through its midlength portion a cut-out or circular aperture to receive the aforesaid standard 7. A reinforcing rib 21 upstands from each side of said plate 20. A pair of screwthreaded pins 22 connect the end portions of the clamp plate 20 with the side portions of the plate portion 16, a winged nut 22a screwing onto the upper end portion of each of these pins. The aforesaid clamp plate 20 has at each end a downward extension 23, viewed from below in Fig. 4, which is elliptically shaped, thus being broadened at the center so as to afford a good anchorage for the pin 22 that threadedly passes through it.

In addition to the casters 25 provided for the feet 9 of the stool, a caster 26 is provided for the attachment, the latter caster by preference and as shown being located under the central portion of the seat 12 for the conventional motor control 13 which has the foot operable pedals or arms 28.

The front portion of the circular depression 12 is located adjacent to the front edge of the plate 11 and a cut-out 12a provides a level surface across this edge portion of the plate, thus affording a clearance for the plug-in connection 30 carried by the cable 31, and a shoulder 12b resulting at each side of this clearance which cooperates with said connection 30 to prevent reactive turning movement of the motor control 13 when the dentist applies his feet to either of the control arms or levers 28. The seat 12 is made of a sufficient diameter to receive the largest motor control that will likely be used, but when smaller motor controls are used the notch or cut-out 12a will suffice to keep them in proper operative position.

A felt washer 32 is shown encircling the lower end of the tubular standard 7 to prevent marring by the clamping plate 20.

The standard 7 of the dental stool shown has a milled collar 7a screwed onto its upper end, and preparatory to assembling the structure which has been described this collar is removed. Then, after removing the seat 5 and its stem 6 from the standard, the clamping plate 20, centrally apertured as aforesaid, is slipped down over said standard and is positioned with its length extending transversely and its ribs 21 extending upwardly, as shown in Fig. 1. Thereafter, preparatory to securing the attaching plate 11 to the base 8 of the stool, said plate is slid rearwardly thus bringing its extension 16 under the stool base, and then the two screwthreaded pins or bolts 22, which have previously been threaded into place in the plate extension 16, have the clamp plate 20 put in place upon them. Then the wing nuts 22a are applied to the upper end portions of said pins, then screwing down said nuts will raise said plate extension 16 up snugly against the bottom of the stool base with the upward projections 17, 18 and 19 of the plate portions 14 and 16 properly interlocked with the inter-foot portions of the stool base.

It is to be noted that, in the assembled structure the caster 26 of the attachment is on the same level as the casters 25 of the feet of the stool. Therefore the dentist, while remaining comfortably seated upon the stool, can place this feet upon the floor and both turn and bodily move the device as he desires. Along with this, by vertically adjusting the seat of the stool he can assume any desired position in relation to his patient, in relation to height, distance and angularity. Furthermore, while the dentist is at work he can comfortably rest his feet upon the spacious side areas 15 of the plate body 14 adjacent to the mounted motor control 13, and when he wishes to operate the motor control arms 28 he can do so with the toe portions of his feet without lifting his heels from their restful position. Also, whenever necessary to do so, he can, while seated, place his feet astride the casing of the motor control (which has a bead 13a around its top), lift the motor control from its seat and bodily deposit it on any desired adjacent part of the floor. Moving the dental motor control about in this manner makes it unnecessary for the dentist to resterilize his hands after said motor control.

I claim:

1. In combination with a stool having a vertical standard mounted on a base provided with outwardly extending carrying feet, a motor control support and foot rest means comprising: a substantially horizontal plate having an end portion underlying the vertical standard and base and an opposite end portion provided with a recessed seat for a motor control; a clamping plate apertured to fit around the vertical standard and positioned above the base; and means effective to secure the clamping plate to the horizontal plate.

2. The subject matter of claim 1 and said clamping plate having thickened end portions on diametrically opposite sides of the aperture through the plate, and said means comprising a screwthreaded member operative to draw together each thickened end portion of said clamping plate and the adjacent end portion of the horizontal plate.

3. The subject matter of claim 1 and, said recessed seat for the motor control being a substantially circular depression in said opposite end portion in the horizontal plate, and there being a cut-out leading from the front edge of said depression to the front edge of the plate, said cut-out being of substantially the same depth as said depression and positioned and dimensioned to receive a plug-in attachment for the motor control.

4. In combination with a dental stool having a vertical standard mounted on a base portion which is provided with outwardly extending carrying feet, a substantially horizontal plate having an end portion underlying said base portion of the dental stool and an opposite exposed end portion provided with a seat for a dental motor control, a clamping plate overlying said base portion and having a cut-out to accommodate the aforesaid standard of the stool, clamping means positioned to operate between said two plates; and a plurality of upstanding projections on said horizontal plate, said projections having side portions directed toward each other which conform in shape to and fit into the spaces between adjacent carrying feet of the stool.

5. In combination with a dental stool having a vertical standard upstanding from a base portion provided with radially extending, circumferentially spaced apart carrying feet, a substantially horizontal plate having an inner end portion underlying said base portion of the dental stool and an opposite exposed outer end portion provided with a seat for a dental motor control, said exposed portion of said plate being upwardly offset throughout the space between two adjacent feet with respect to said inner end portion which underlies said base portion, said exposed end portion having its rear side portion conformed in shape to and abutted against the side faces of said two adjacent feet, a plurality of upward projections carried by that end portion of said plate which underlies said base portion, the latter projection conforming to and abutting against the adjacent side portions of the remaining inter-foot spaces, a clamping plate overlying said base portion and having a cut-out to accommodate the standard of the stool, and clamping means gripping said base portion of the stool between said clamping plate and said horizontal plate.

6. The combination, with a dental stool having a vertical standard mounted on a base portion provided with outwardly extending carrying feet; of a substantially horizontal plate having a rear end portion underlying said base portion and a front end portion projecting forwardly of said base portion and provided with an upwardly facing seat for a dental motor control, said front portion having a rise rearwardly adjacent to said seat, said rise forming a rearwardly facing shoulder conforming to and abutting against the side faces of the inward portions of adjacent feet of said carrying feet, a clamp plate overlying said base portion of the stool, and clamping means clamping said rearwardly extending plate portion and clamp plate to each other with said base portion of the stool between them.

7. A caster supported dental stool attachment for a dental stool having a base portion provided with carrying feet, said attachment in its attached position having a substantially horizontal caster supported part extending forwardly of the stool and a rear part underlying the base portion of the stool, said forwardly extending part carrying an upwardly facing seat positioned to support a foot-operable dental motor control accessible to the feet of the dentist when he is seated upon the stool, said caster supported part having a foot rest area at each side of said motor control seat, said forwardly extending part comprising a plate having a rise the rear edge portion of which conforms to and fits into the space between adjacent carrying feet of the base portion of the stool, and means securing said rear part to the base portion of the stool.

JOHN E. COOPER.

REFERENCES CITED

The following references are of record in the file of this patent:

UNITED STATES PATENTS

| Number | Name | Date |
|---|---|---|
| 1,119,408 | Dickson | Dec. 1, 1914 |
| 2,424,729 | Andreasen | July 29, 1947 |
| 2,449,385 | Johnson et al. | Sept. 14, 1948 |
| 2,482,885 | Turner | Sept. 27, 1949 |
| 2,596,561 | Johnson et al. | May 13, 1952 |

FOREIGN PATENTS

| Number | Country | Date |
|---|---|---|
| 528,171 | Germany | June 11, 1931 |